United States Patent
Wittenbreder, Jr.

[11] Patent Number: 6,101,108
[45] Date of Patent: Aug. 8, 2000

[54] REGULATED INPUT CURRENT, REGULATED OUTPUT VOLTAGE POWER CONVERTER

[75] Inventor: Ernest Henry Wittenbreder, Jr., Flagstaff, Ariz.

[73] Assignee: Technical Witts, Inc., Flagstaff, Ariz.

[21] Appl. No.: 09/384,313

[22] Filed: Aug. 13, 1999

Related U.S. Application Data

[63] Continuation-in-part of application No. 08/870,504, Jun. 6, 1997, abandoned.

[51] Int. Cl.[7] .............................. H02M 7/00; H02M 7/68; H02M 7/217
[52] U.S. Cl. .............................. 363/65; 363/89; 363/127; 323/222; 323/239
[58] Field of Search .................................. 363/65, 44, 45, 363/81, 84, 21, 89, 123, 125, 127; 323/222, 239, 271, 282, 351

[56] References Cited

U.S. PATENT DOCUMENTS

| | | | |
|---|---|---|---|
| 5,224,025 | 6/1993 | Divan et al. .............................. | 363/16 |
| 5,406,192 | 4/1995 | Vinciarelli .............................. | 323/222 |
| 5,440,473 | 8/1995 | Ishii et al. .............................. | 363/21 |
| 5,515,257 | 5/1996 | Ishii .............................. | 363/21 |
| 5,572,417 | 11/1996 | Vinciarelli et al. .............................. | 363/89 |
| 5,621,631 | 4/1997 | Vinciarelli et al. .............................. | 363/89 |
| 5,726,872 | 3/1998 | Vinciarelli et al. .............................. | 363/89 |

*Primary Examiner*—Edward H. Tso
*Assistant Examiner*—Bao Q. Vu

[57] ABSTRACT

The power conversion system of this invention achieves precisely regulated input current and precisely regulated output voltage in a two step process whereby one power converter sub-system (141) provides input current regulation and a second power converter sub-system (158) provides output voltage regulation. The two converter sub-systems are arranged so that the second power converter sub-system (158) is powered by the first power converter sub-system (141) and the output of the second power converter sub-system (158) is placed in series with an output of the first power converter sub-system (141) to form the system output so that the load voltage is the sum of the two outputs placed in series. With this arrangement only a small fraction of the load power needs to be processed by the second power converter sub-system (158) which yields higher system efficiency and smaller system size, weight, and cost.

3 Claims, 9 Drawing Sheets

REGULATED INPUT CURRENT, REGULATED OUTPUT VOLTAGE POWER CONVERTER

This application is a CIP of Ser. No. 08/870,504 filed on Jun. 6, 1997, now abandoned.

BACKGROUND OF THE INVENTION

1. Field of the Invention

The subject invention generally pertains to electronic power conversion circuits, and more specifically to high frequency switched mode power conversion electronic circuits with active power factor correction.

2. Description of Related Art

Figure 1:
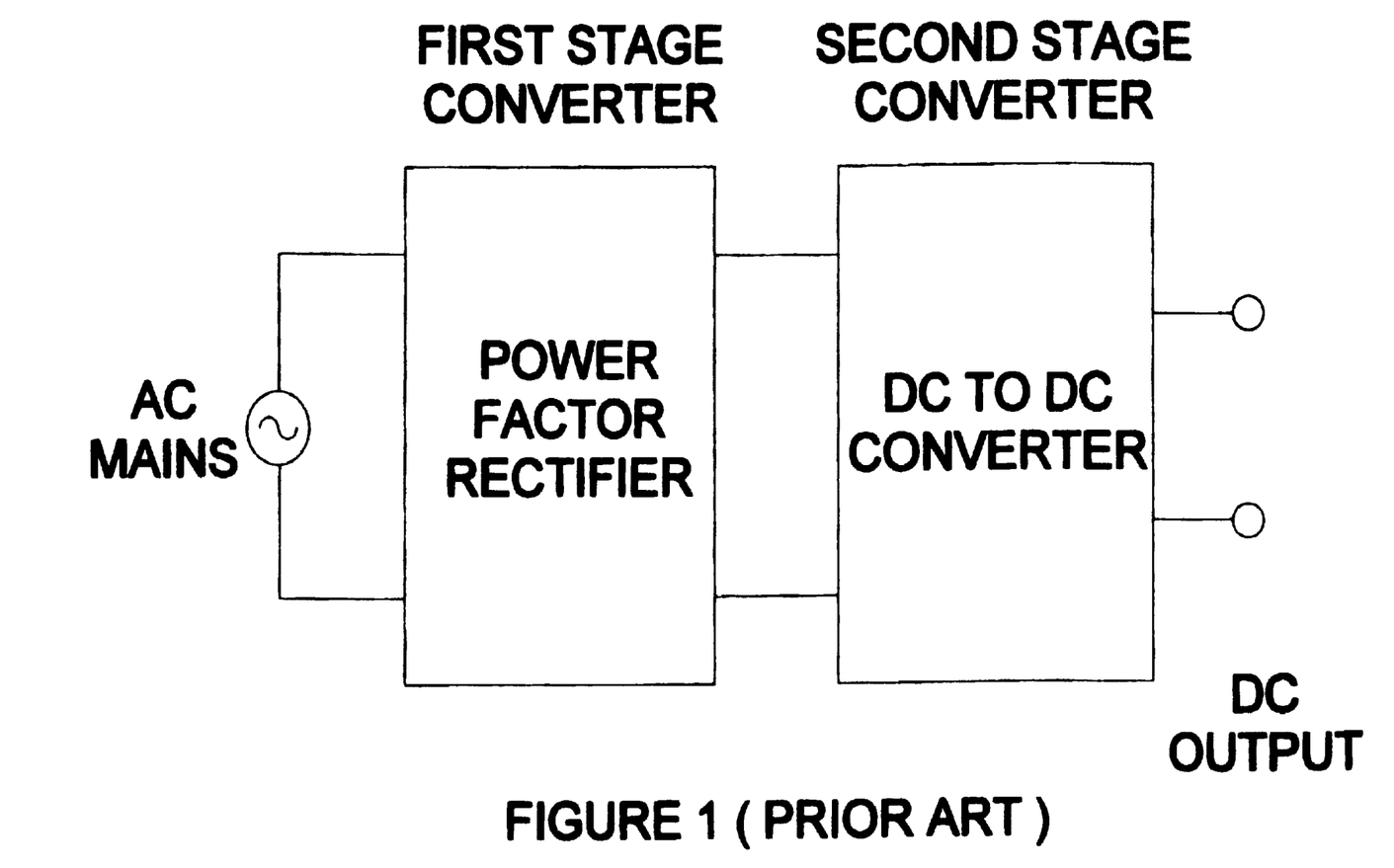
FIG. 1 illustrates a typical two stage power factor corrected power conversion system block diagram in which the first stage accomplishes power factor rectification, the second stage provides output voltage regulation, and both stages process all of the load power.
Figure 2:
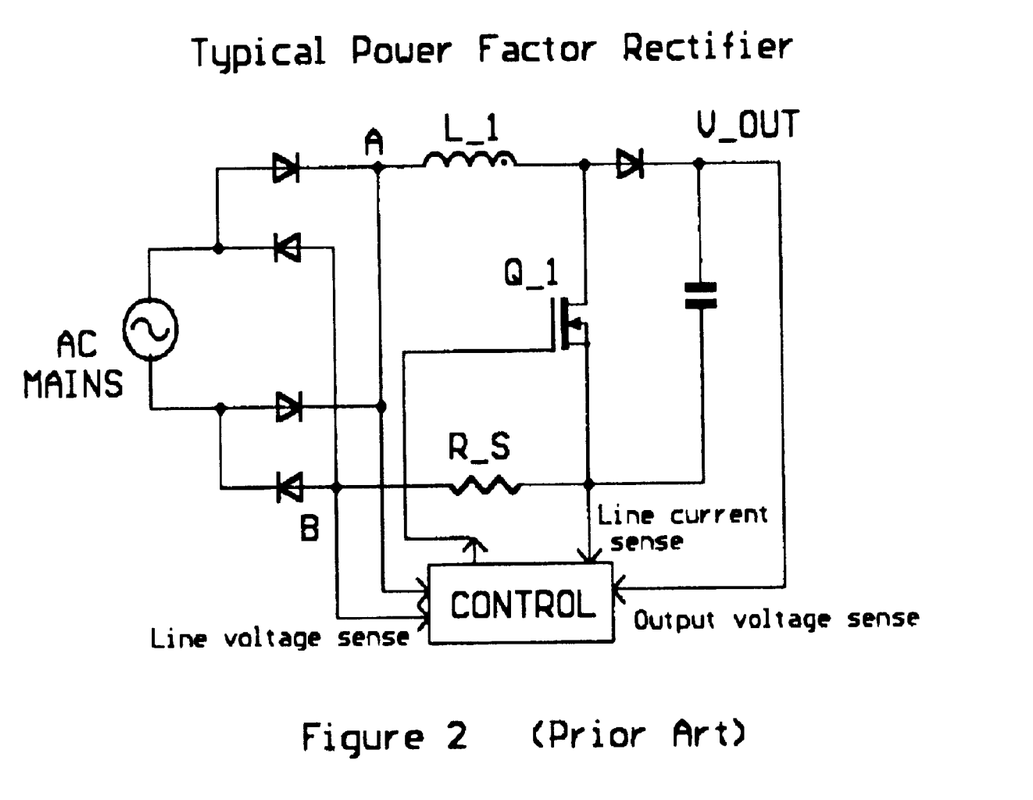
FIG. 2 illustrates a typical active power factor rectifier as commonly used in many present day power factor controlled power conversion systems.
Figure 3:
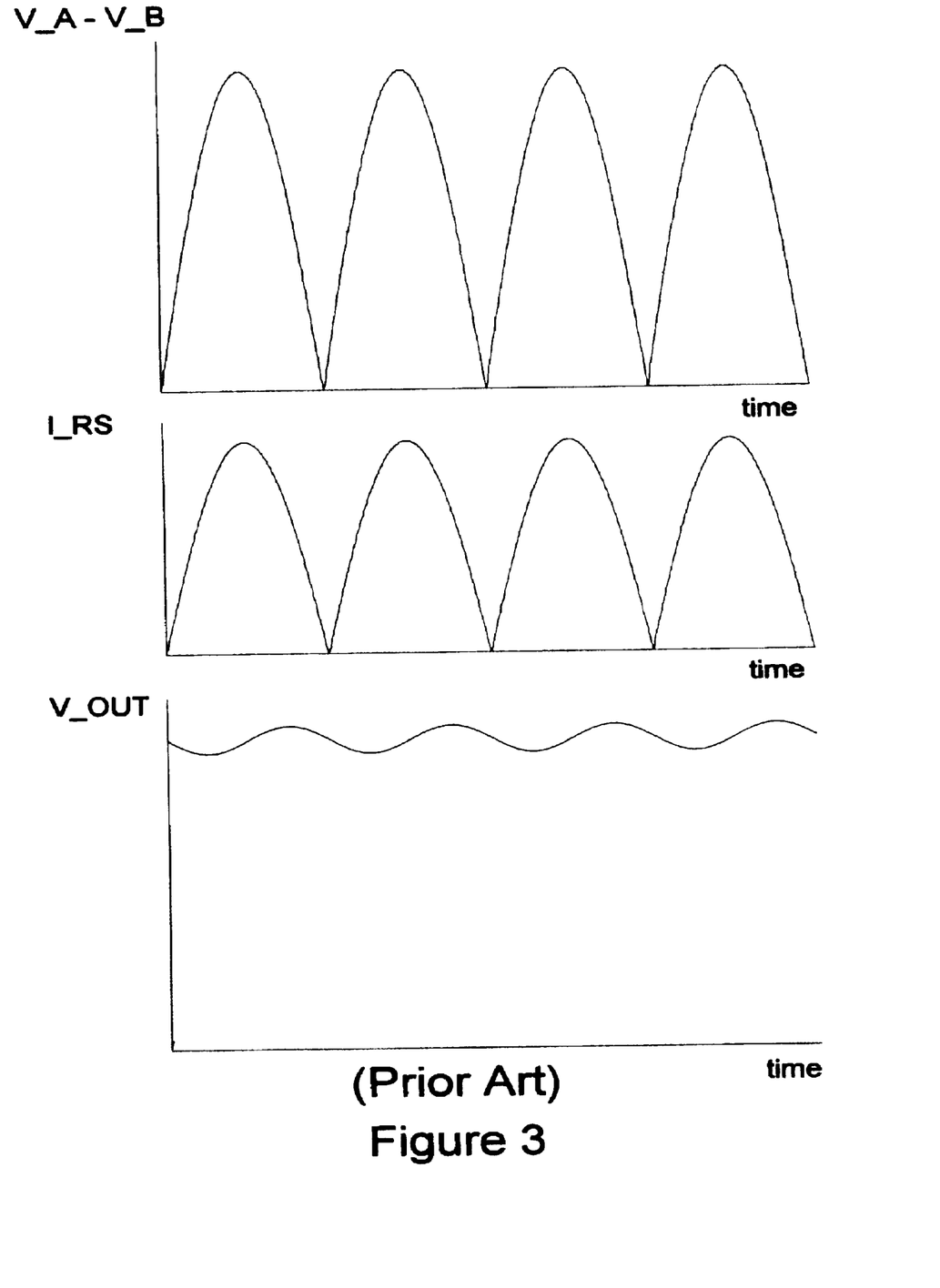
FIG. 3 illustrates wave forms of the FIG. 2 power factor rectifier.
Figure 4:
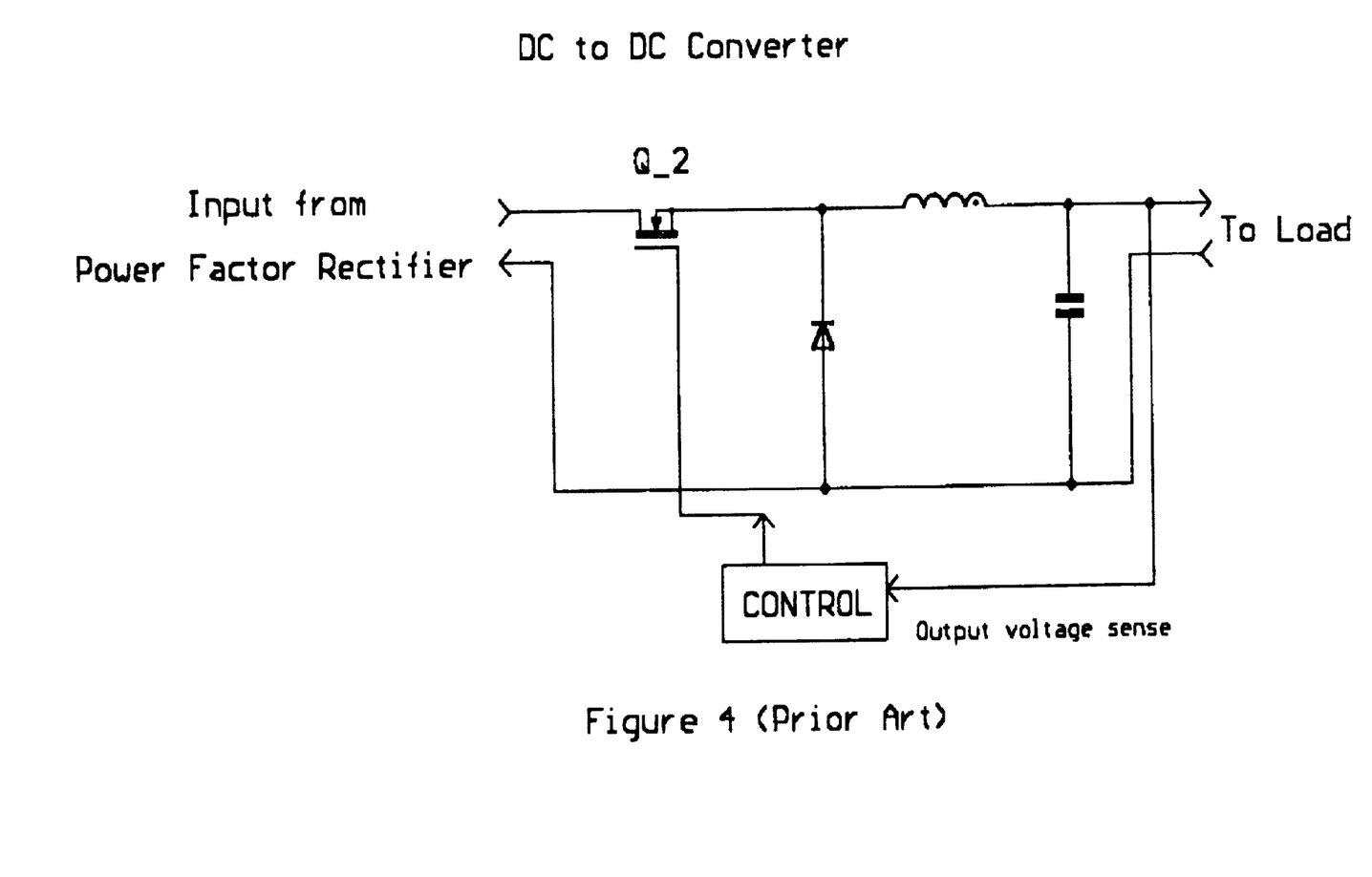
FIG. 4 illustrates a DC to DC converter as might be used as a post regulator to accomplish tight output voltage regulation as part of a power factor controlled power conversion system.

Power factor correction electronic circuits are useful for reducing line current harmonics. These circuits improve power quality and provides a friendlier interface between the power utility and electronic apparatus of all sorts. The ideal power line interface is a resistor. With a resistor load to the power line interface the line current is directly proportional to the line voltage. With many electronic circuits connected to the power line the input is a rectifier or rectifier bridge with a capacitor line frequency filter. For most of the line frequency cycle the diodes do not conduct and the line current is zero since the diodes are reverse biased by the line filter capacitor. When the diodes become forward biased it is only for a very small fraction of the line cycle when the currents are very large, typically four to ten times larger than the average current. With this rectifier and capacitor arrangement the line current is zero for most of the line cycle and the line current wave form consists of short sharp high magnitude pulses, occurring typically twice per line cycle. These current pulses contain high order harmonics of the line frequency and provide a difficult and uneven interface to the power grid. Power factor is one measure of how close the current wave form is to a sine wave. Power factor correction refers to any method that reduces the harmonics of the line current wave form resulting in a line current wave form that more closely resembles a pure sine wave. Some countries are now mandating that line current harmonics of electronic apparatus be limited. One method of power factor correction is to place a line frequency low pass filter at the input to the power converter. Such a filter would pass the line frequency fundamental component and reject harmonics of the line frequency. A line frequency filter is seldom the choice for reducing line frequency harmonics because of the size and weight of a suitable line frequency filter. There are power conversion circuits that accomplish active power factor correction by regulating the input current so that the input current is proportional to the input voltage. By modulating the duty cycle of the converter to force the input current to be proportional to the input voltage the circuit appears as a resistor to the utility interface. Active power factor correction circuits are becoming prolific because they regulate line current and thereby eliminate line current harmonics which would exist without the line current regulation circuits, thereby enabling manufacturers of electronic apparatus to comply with the legal mandates for line current harmonics. The power converter circuits that regulate line current, called power factor rectifiers by those skilled in the art of power conversion, also regulate output voltage, but the output voltage regulation is poor. The control circuit forces the input current to be proportional to line voltage and only uses the output voltage error to set the constant of proportionality. Typically the current regulation control loop of a power factor rectifier is fast and can respond quickly to line voltage changes to correct the input current, but the output voltage regulation loop is much slower. The bandwidth of the outer voltage control loop is much less than the line ripple frequency so that the output voltage regulation is poor and contains a large line ripple frequency component. By increasing the bandwidth of the output voltage control loop, the control of the input current is reduced, so that there is a trade off between output voltage control and input current control. It is impossible to obtain precise control of both output voltage and input current with a single power conversion stage. If both the input current must be precisely regulated and the output voltage must be precisely regulated then a second stage of power conversion is required. The second stage of power conversion will typically follow the first power factor rectifier stage in a series connection where each stage processes all of the power, i.e., all of the load power must pass through each power converter stage and the output power of the first stage is the input power to the second stage. An example of a typical power converter system with active power factor correction (regulated input current) and precisely regulated output voltage is shown in FIG. 1. In FIG. 1 the first converter, a power factor rectifier, precisely regulates line current and loosely regulates its output voltage and the second power converter precisely regulates output voltage. The power factor rectifier consists of a diode rectifier circuit which changes the AC line voltage to a pulsating DC voltage and a suitable DC to DC converter. In general, a rectifier refers to a circuit that changes AC into DC. A power factor rectifier is a circuit that changes AC into DC and also provides a regulated line current with low line frequency harmonic content. One example of a power factor rectifier is shown in FIG. 2. Wave forms for the FIG. 2 circuit are shown in FIG. 3. The circuit shown in FIG. 2 is a full wave bridge diode rectifier and a boost converter. The boost converter is the most common converter choice for a power factor rectifier, but not the only choice. The circuit shown in FIG. 2 is almost identical to FIG. 19.7 in *Solid State Power Conversion Handbook* by Ralph Tarter. Many other examples of power factor rectifiers are found in the publications of the IEEE Power Electronics Society, such as the proceedings of the Power Electronics Specialists Conference, the Applied Power Electronics Conference, and the IEEE Transactions on Power Electronics. All of these conference proceedings for the last decade or more will have several papers on power factor rectification topics. Other examples of topologies for DC to DC converters used in power factor rectifiers include the flyback converter, the buck boost converter, the SEPIC converter, and the Cuk converter. Any DC to DC converter that has the capability of delivering power to its output down to, but not including, zero input voltage is a suitable alternative to the boost converter, shown in FIG. 2. The control block of FIG. 2 modulates the duty cycle of Q1 to provide fast current regulation to force the input current, $I_{RS}$, as sensed by $R_S$ to be proportional to the input voltage, which is $V_A-V_B$. See FIG. 3. Since the input current is proportional to the input voltage the power factor rectifier appears as a resistor to the line and the line current harmonics are largely eliminated. The control block also senses the output voltage, but the response to output voltage variations is slow with a control loop bandwidth much less than the output voltage ripple frequency. For a 60 hertz line frequency the circuit shown will have a substantial 120 hertz output ripple component, as illustrated in FIG. 3, since the line frequency is effectively doubled by the diode rectifier circuit. The output voltage for the FIG. 2 circuit is typically about 375 volts for an AC mains line input voltage range of 90 to 264 volts rms. The line frequency ripple magnitude will be load dependent and may be in the range of 10% or approximately 40 volts peak to peak for the maximum load. The large ripple voltage variation at the output of the boost power factor rectifier is not acceptable for many applications so a second stage of regulation that provides precise output voltage regulation is typically added. FIG. 4 illustrates a simple DC to DC converter representative of the second block of FIG. 1. FIG. 4 illustrates a buck converter which contains a control circuit that sets the duty cycle of Q2. The control circuit of FIG. 4 senses the output voltage and precisely regulates the output voltage. The bandwidth of the outer voltage loop of the control circuit must be significantly higher than the line frequency ripple or the control loop must contain an input voltage feed forward mechanism that rejects the line frequency input voltage variations. These features are typical of DC to DC converters used for the purpose of output voltage regulation.

The prior art illustrated shows a series connection of a power factor rectifier and a DC to DC converter, each of which processes all of the power that is ultimately delivered to the load. The power processed by the boost converter contained in the power factor rectifier of FIGS. 1 and 2 is equal to the average voltage at the input of the boost converter multiplied by the average current delivered to the boost converter at its input or the average input power, which is also equal to the average voltage at the output of the boost converter multiplied by the average current delivered by the boost converter at its output divided by the efficiency of the boost converter. For the boost converter the power processed is slightly greater than the total power delivered to the load, or one can say simply that all of the load power is processed by the boost converter. For the second stage DC to DC converter of FIGS. 1 and 4 one can also say that all of the load power is processed by the second stage DC to DC converter. The power processed by the DC to DC converter will be equal to the average voltage at the input to the DC to DC converter multiplied by the average current delivered to the input of the DC to DC converter or the average input power, or alternately, it is the average voltage supplied at the output of the DC converter multiplied by the average current delivered to a load at the output of the DC to DC converter, divided by the efficiency of the converter. If the load power is 1 kilowatt then we can say that the prior art system consists of two 1 kilowatt power converters placed in series. The 1 kilowatt figure is a measure of both the output power capability and the power processed by the individual converters in the two converter system.

In the scheme illustrated in FIG. 1 all of the power is processed by both sub-converters. The size, weight, and cost of a power conversion circuit are all roughly proportional to the power processed by the power conversion circuit, although there is some dependence of size, weight, and cost on the peak power processed.

OBJECTS AND ADVANTAGES

An object of the invention is to accomplish precise input current regulation for high power factor and low line current harmonics.

Another object of the invention is to accomplish precise output voltage regulation for effective load operation.

Another object of the invention is to accomplish higher operating efficiency than can be obtained by a two stage converter in which each conversion stage processes all of the load power passing from the input of the converter system to the output of the converter system.

Another object of the invention is to accomplish higher power density and lower system cost than can be obtained with a two stage converter system in which each conversion stage processes all of the load power passing from the input of the converter system to the output of the converter system.

Further objects and advantages of my invention will become apparent from a consideration of the drawings and ensuing description.

These and other objects of the invention are provided by a novel circuit technique that uses a two stage power conversion system in which the first stage processes all of the load power and accomplishes precise input current regulation, i.e., any standard power factor rectifier, and a second power conversion stage which processes only a small fraction of the total load power and, in combination with the first converter stage, accomplishes precise output voltage regulation. By virtue of the fact that the second power conversion stage processes only a small fraction of the total system power it can be made considerably smaller, lighter, and less costly than a second stage of conversion which processes 100% of the total load power. In addition, the second stage, which processes only a small fraction of the total load power, will produce losses which are much lower than the losses of a power converter which processes 100% of the total load power and, thereby, the two converter system will be more efficient than a power converter system in which the second stage of conversion processes 100% of the total load power. The novel circuit accomplishes the tight output load voltage regulation by providing a first stage of power conversion that has an output coupled to the load that provides loose or imprecise voltage regulation with a significant line frequency ripple component and adding to that first stage output in a series connection the output of the second stage converter which provides a varying output voltage that complements the first stage output voltage such that the sum of the two output voltages adds to a constant DC voltage which is applied to the load. The current output of the second stage converter is equal to the load current and equal to the net current provided by the first stage output including any capacitor connected to the first stage output. The second converter stage derives its input from the output of the first converter stage and provides its output arranged in series with the output of the first stage converter to provide precise output voltage regulation. There is no requirement that the input current of the second converter stage be regulated. The output voltage of the second converter stage is controlled to provide a precisely regulated variable voltage such that the total load voltage remains invariant. The sum of the output voltage of the first stage converter and the output voltage of the second stage converter is held precisely constant by the control loop of the second stage converter. The peak-to-peak line frequency ripple voltage component of the first stage output voltage would be typically in the range of 1% to 10%, depending on the amount of line ripple frequency filtering and the load power. The peak of the output voltage of the first stage converter is set to be slightly less than the desired output voltage of the converter system. The output voltage of the second power conversion stage will be in the range of 5% to 15% of the desired output voltage and the power contributed by the second stage of power conversion to the load will be in the range of 5% to 15% of the total system power and will vary as the line frequency ripple voltage of the output of the first stage converter varies. The power delivered directly to the load via the output of the first conversion stage will be 85% to 95% of the total system power and will vary as the line frequency ripple voltage of the first conversion stage varies in such a way that the fraction of power delivered to the load by the output of the first stage converter plus the fraction of load power delivered by the second stage converter adds up to 100% of the total load power.

BRIEF DESCRIPTION OF THE DRAWINGS

The present invention is illustrated by reference to the drawings in which like reference numerals refer to like elements of the invention.

REFERENCE NUMERALS

137 AC input power source
138 lead
139 input terminal
140 lead
141 power converter sub-system
142 input terminal
143 output terminal
144 output terminal
145 lead
146 node
147 lead
148 node
149 lead
150 lead
151 lead
152 capacitor
153 node
154 lead
155 node
156 input terminal
157 input terminal
158 power converter sub-system
159 output terminal
160 output terminal
161 lead
162 lead
163 lead
164 node
165 capacitor
166 lead
167 lead
168 DC load

SUMMARY

The subject invention uses a power converter which regulates its input current in order to achieve high power factor and a second much lower power converter to achieve regulated output voltage when the output of the second power converter is added in a series connection to the output of the first power converter. The output of the first power converter and the output of the second power converter are arranged in a series connection so that output current provided to the load and the output current of the second power converter are equal. The output load voltage is the sum of the output voltage of the first power converter plus the output voltage of the second power converter. This arrangement results in a power conversion system in which the large majority of the load power is provided directly by the first power converter and the second converter provides only a small fraction of the output power and precise load voltage regulation. The second power converter can therefore be made much smaller than the first power converter and the power conversion system provides higher efficiency and lower cost than a power conversion system in which two converters must process all the power in order to achieve both precisely regulated input current and precisely regulated output voltage.

DESCRIPTION OF THE PREFERRED EMBODIMENTS

Referring to FIG. 4 there is shown a series parallel power processing system. The system employs two power conversion sub-systems. The two power conversion sub-systems are arranged in a unique and novel way that produces beneficial and unexpected results. These beneficial and unexpected results are largely independent of the specific topological choice and specific circuit construction of the power converter sub-systems. Consequently, the two power converter sub-systems will not be described as specific power converter circuits, but generally as circuits of any type that convert power and behave generally in the manner described herein. Specific examples are provided after the general structure and operation are specified. The first power conversion sub-system accomplishes power factor rectification. The input to the first power conversion sub-system is the AC Mains. The first power conversion sub-system provides an output and fast regulation of the AC Mains current such that the input current to the first power conversion sub-system is proportional to the magnitude of the AC Mains voltage. The first power conversion sub-system also provides a slow and imprecise regulation of the output voltage of the first power conversion sub-system. Fast regulation implies a control loop bandwidth much higher than the line ripple frequency. Slow regulation implies a control loop bandwidth less than the line ripple frequency. The first power conversion sub-system provides an output which is used to drive both a load and the second power conversion sub-system. The second power conversion sub-system provides a single output which is added in series with the output of the first power conversion sub-system to drive a load. The sum of the output voltage of the first power conversion sub-system plus the output voltage of the second power conversion sub-system is equal to the output load voltage. The second power conversion sub-system provides for a constant, precise, and well regulated load output voltage. The second power converter sub-system provides fast regulation of the sum of two voltages: 1. the output voltage of the first power converter sub-system plus 2. the output voltage of the second power converter sub-system; by adjusting the duty cycle of the second power converter sub-system and thereby controlling the output voltage of the second power converter sub-system. Moreover, it will be recognized by one skilled in the art that, while only a single load output is considered in this analysis, multiples of load outputs may be obtained by either adding a DC transformer with multiple secondaries for multiple outputs or by adding outputs to the first power converter sub-system and providing multiples of the second power converter sub-systems, as herein to be described, for each output that requires precise output voltage regulation.

Structure

Figure 5:
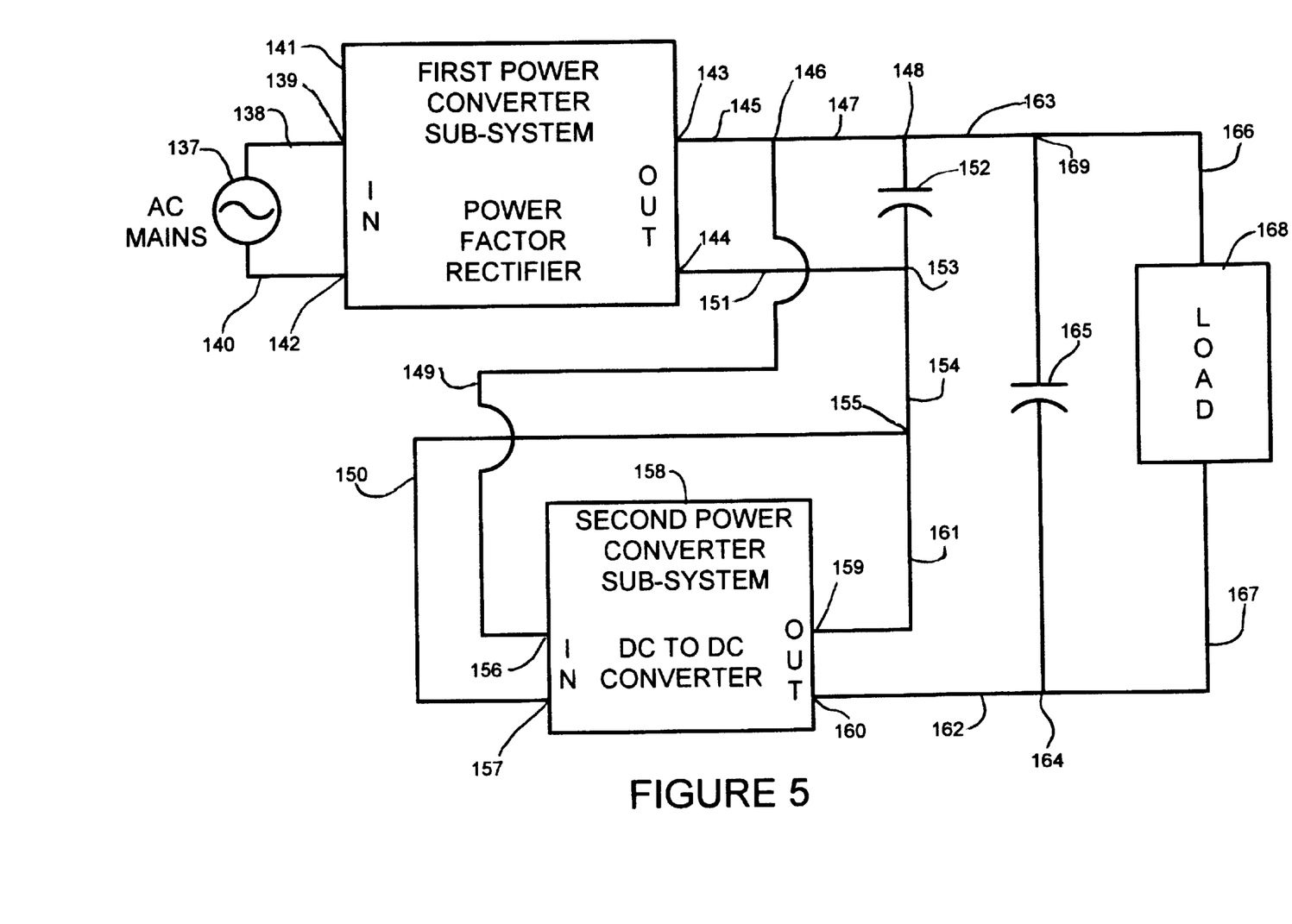
FIG. 5 illustrates a two stage power converter system block diagram according to the subject invention in which the first stage accomplishes power factor rectification and the second stage provides output voltage regulation by processing only a small fraction of the total load power.

An embodiment in which the first power converter sub-system has only one output which is used both for providing power to the load and for providing power to the second power converter sub-system is shown in FIG. 5. In this embodiment an AC Mains power source 137 is connected to a lead 138. Lead 138 is connected to an input terminal 139 of a first power converter sub-system 141. The return of source 137 is connected to a lead 140. Lead 140 is connected to a second input terminal 142 of converter 141. An output terminal 143 of converter 141 is connected to a lead 145. A second output terminal 144 of converter 141 is connected to a lead 151. Lead 145 is connected to a node 146. Node 146 is connected to a lead 149 and to another lead 147. Lead 147 is connected to a node 148. Node 148 is connected to a first terminal of a capacitor 152 and to a lead 163. Lead 151 is connected to a node 153. Node 153 is connected to a second terminal of capacitor 152 and to a lead 154. Lead 149 is connected to an input terminal 156 of a second power converter sub-system 158. Lead 154 is connected to a node 155. Node 155 is connected to a lead 150. Lead 150 is connected to a second input terminal 157 of converter 158. An output terminal 159 of converter 158 is connected to a lead 161. A second output terminal 160 of converter 158 is connected to a lead 162. Lead 161 is connected to node 155. Lead 162 is connected to a node 164. Node 164 is connected to a first terminal of a capacitor 165 and to a lead 167. Lead 163 is connected to a node 169. Node 169 is connected to a second terminal of capacitor 165 and to a lead 166. Lead 166 is connected to a first terminal of a load 168. Lead 167 is connected to a second terminal of load 168.

Operation

Figure 6:
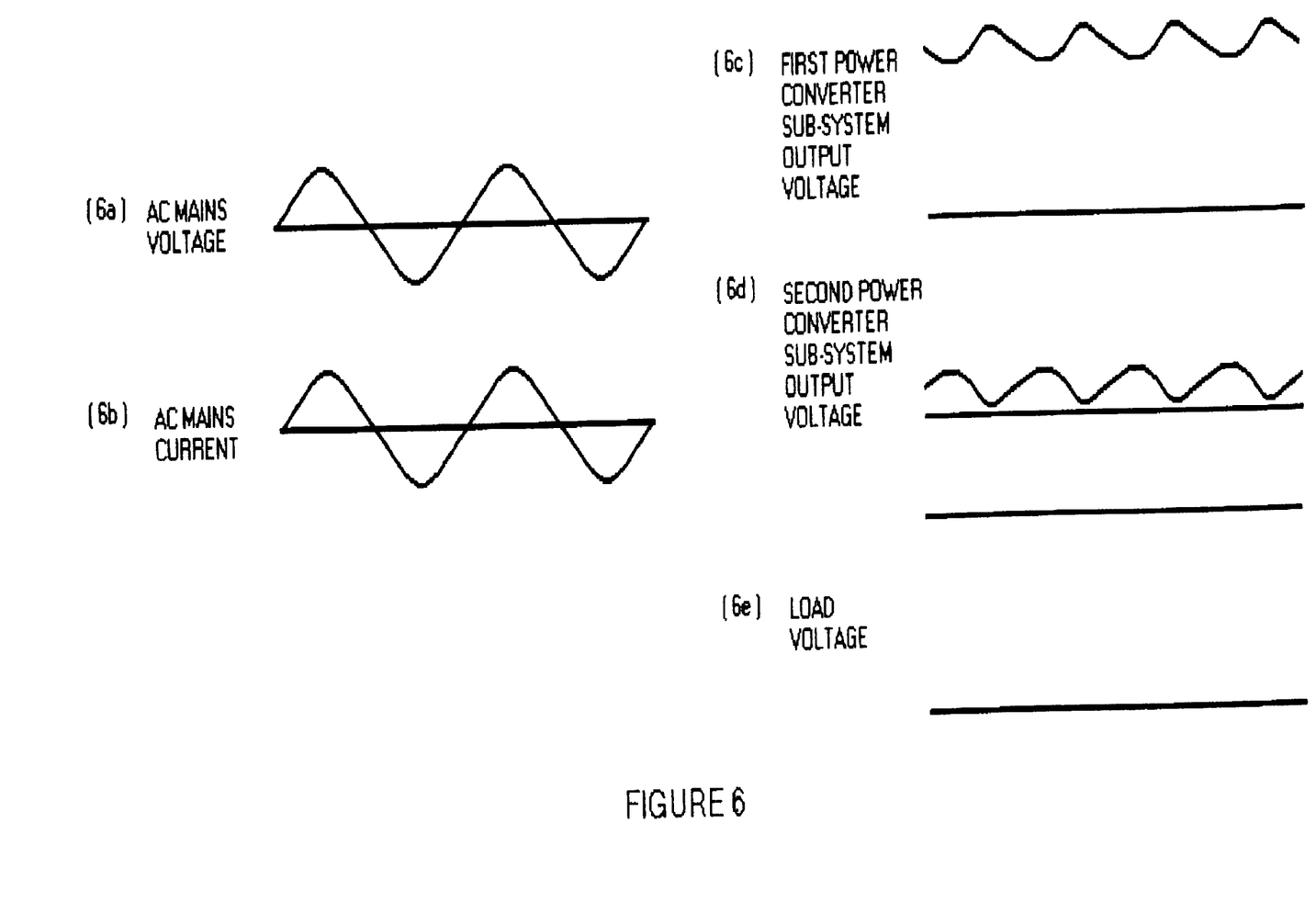
FIGS. 6a through 6e are wave form timing diagrams which illustrate the operation of the power conversion system of FIG. 5.

FIG. 6a shows the sinusoidal applied voltage wave form of source 137. The control loop of converter 141 regulates the input current of converter 141 and the current drawn from source 137 so that the input current wave form of converter 141 is sinusoidal and proportional to the source 137 voltage. The wave form of the source 137 current and the input current of converter 141 is shown in FIG. 6b. Converter 141 appears to source 137 as a resistor, i.e., the current draw of converter 141 is proportional to the applied voltage. Converter 141 appears as an ideal load to source 137.

The output of converter 141 is used to provide power to load 168 and to provide power to converter 158. Capacitor 152 is used to store energy that can be used to provide energy to load 168 and to converter 158. The control loop of the converter 141 is used primarily to regulate source 137 current and secondarily to regulate the output voltage of converter 141. The feed back control system for converter 141 provides a fast control loop for precisely controlling input current and a slower outer voltage control loop for loosely controlling the output voltage of converter 141. The implementation of a control system with a fast current loop for precisely controlling input current and a slower outer loop for regulating the output voltage is well known and understood by those who are skilled in the art of power conversion. There exist standard industry control integrated circuits whose purpose is to specifically provide the type of control described here for power factor correction. These standard industry power factor correction control integrated circuits and their operation are familiar to those who are skilled in the art of power conversion. One consequence of the precise input current regulation and the slow outer voltage control loop in converter 141 is a relatively large AC voltage component in the output of converter 141. The fundamental frequency of the AC voltage component of the output voltage of converter 141 is, typically, a low order harmonic of source 137 frequency. For a single phase AC Mains the frequency of the AC voltage component at the output of converter 141 is typically twice the frequency of source 137. This result can be seen by considering that the power provided by source 137 drops to zero twice during each cycle of AC Mains operation when all power output from converter 141 must be provided by energy storage elements internal to or connected to converter 141. The size (capacitance) of capacitor 152 will largely determine the magnitude of the AC component of the voltage of the output of converter 141. Capacitor 152 provides stored energy for driving the loads attached to converter 141 when the input power to converter 141 is less than the average input power provided by source 137. The voltage wave form of the output of converter 141 is shown in FIG. 6c.

Converter 158 employs a control system that samples the voltage applied to load 168 and corrects for any variation in load 168 voltage. The control loop of converter 158 provides high speed voltage error correction with a control loop unity gain crossover frequency that exceeds the frequency of the AC voltage components of the output of converter 141. The design and implementation of such a high speed voltage control loop is well known and understood by one skilled in the art of high frequency power conversion. The load 168 voltage is the sum of the output voltage of converter 141 and the output voltage of converter 158. The output of converter 158 contains an AC voltage component equal in magnitude to the AC voltage magnitude of the output of converter 141, but 180 degrees out of phase with respect to the AC voltage component of the output of converter 141. The voltage wave form of the output of converter 158 is shown in FIG. 6d. Since the output of converter 141 is added to the output of converter 158 and the AC voltage components of the two summed outputs are equal in magnitude and opposite in phase, the sum of the two voltages will have an AC voltage component that is substantially zero. The wave form of the summed voltages of the output of converter 141 and the output of converter 158, which is equal to the load 168 voltage, is shown in FIG. 6e. Capacitor 165 is placed in parallel with load 168 to filter out switching frequency AC ripple generated by the output of converter 158. Another reason for employing capacitor 165 is to provide stored energy for load 168 voltage stability in response to a fast load 168 current transient.

As can be seen from FIGS. 6c, 6d, and 6e the voltage provided by converter 158 is a small fraction of the voltage provided by converter 141. Since the output of converter 158 is in series with load 168 the current provided by converter 158 is equal to the load 168 current. Since power is equal to voltage times current the power provided by converter 158 is a small fraction of the load 168 power. The power provided to converter 158 by converter 141 is a small fraction of the load 168 power, if one assumes reasonable efficiency, i.e., a switched mode power supply, for converter 158. The power processed by converter 158 is a small fraction of the load 168 power. The power provided to load 168 by converter 141 is a large fraction of the load 168 power but less than all of the load 168 power, since a small fraction of the load 168 power is provided by converter 158. The total power processed by converter 141 is slightly greater than the full load 168 power. In addition to providing power directly to the load, converter 141 also provides power to converter 158. The sum of the power processed by converters 141 and 158 is one plus a small fraction times the total load 168 power. Since the total power processed is significantly reduced, by comparison to the prior art, the total power losses will be significantly reduced, by comparison to the prior art, and the overall efficiency will be significantly greater, by comparison to the prior art. In addition to power savings and an improvement in efficiency over the prior art the subject invention also provides benefits to size, weight, and cost. The subject invention employs two converter stages in which the second sub-converter processes only a small fraction of the total load power, which enables the second sub-converter and the system to be smaller, lighter, and less costly.

The choice of converter topology for converters 141 and 158 is largely irrelevant. There are many suitable topological choices for converters 141 and 158. For converter 141 the most suitable choice would be any converter that is capable of transferring power from input to output over the full range of input voltages down to zero volts. The topological choices that meet this criteria include almost any boost or buck boost derived topology. Examples of suitable topological choices for converter 141 include the flyback converter, the SEPIC converter, and the Cuk converter. An example of a topological choice that is less suitable is any buck derived topology, since these will not have the ability to transfer power from its input as the input voltage approaches zero volts. Buck derived converters are, generally, step down converters and any topology that can transfer power from input to output at input voltages approaching zero must be able to step up.

For the 158 converter the most suitable topological choices are those that can step down so that buck and buck boost derived topologies are the better choices and the boost derived topologies are less suitable choices. The 158 converter has an input that is mostly DC and, generally, does not approach zero, but its output voltage must be able to drop down to voltages that are very near to zero. If a converter must operate with output voltages that approach zero then those topologies that are step up type converters are less suitable for the mission. Boost topologies are, in general, step up type converters and, thus, are less suitable topological choices for the 158 converter. Examples of well suited topologies for the 158 converter include the flyback, buck, buck boost, forward, and Cuk converters.

Another consideration for selection of the 158 converter topology is that the 158 converter must be capable of fast and precise output voltage control which implies an outer voltage control loop bandwidth that exceeds the line voltage ripple frequency by approximately an order of magnitude. There are techniques, known to those who are skilled in the art of power conversion, for improving bandwidth that would enable any of the topological choices to meet the bandwidth requirement, but the bandwidth requirement will, in general, be more easily met by choosing buck derived topologies, rather than boost or buck boost derived topologies.

Related Embodiments

Figure 7:
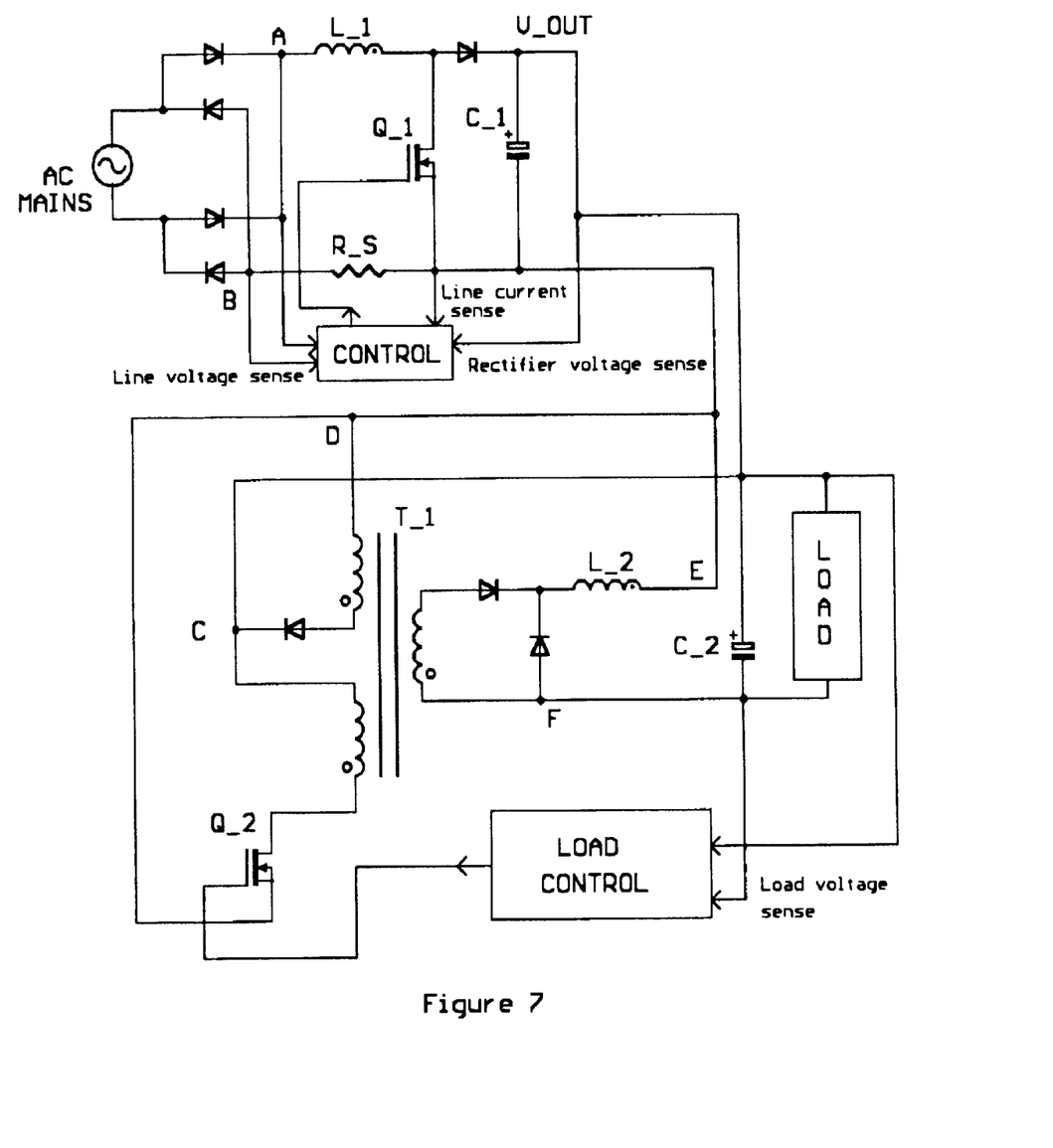
FIG. 7 illustrates one example of an embodiment of the subject invention using a boost power factor rectifier as the first power converter sub-system and a much lower power single ended forward converter as the second converter sub-system used to provide tight load voltage regulation.

FIG. 7 is an example of an embodiment that illustrates the subject invention. In the FIG. 7 example a boost power factor rectifier is chosen as the first converter sub-system. The boost converter operates as a power factor rectifier and provides very precise line current regulation. In the FIG. 7 example a single ended forward converter is chosen as the second converter sub-system. The single ended forward converter operates as a DC to DC converter, which provides very precise load voltage regulation. The input to the single ended forward converter at points C and D in FIG. 7 is also the output of the boost converter. The output of the single ended forward converter is provided at points E and F. The reader will notice that points E and D are electrically connected to each other. The load is connected at points C and F. The reader will notice that the load is driven from the series connection of the outputs of the two sub-converters. The reader will also note that the load voltage is the sum of the output voltages of the two sub-converters. It might appear, at first glance, that the single ended forward converter does not have an output filter capacitor, but the output filter capacitor exists in the circuit and is provided by the series combination of the capacitors, C_1 and C_2. In the FIG. 7 example the boost power factor rectifier processes all the load power, as in the prior art example, shown in FIGS. 1 and 2, but the single ended forward converter of FIG. 7 processes only a small fraction of the total load power, and, therefore, the single ended forward converter, in the FIG. 7 example, can be made much smaller, lighter, and less costly than the second power converter sub-system of the prior art, illustrated in FIGS. 1 and 4, which processes all of the load power. The overall efficiency of the system is also substantially enhanced by virtue of the fact that the second sub-converter, the single ended forward converter, processes only a small fraction of the total load power.

Figure 8:
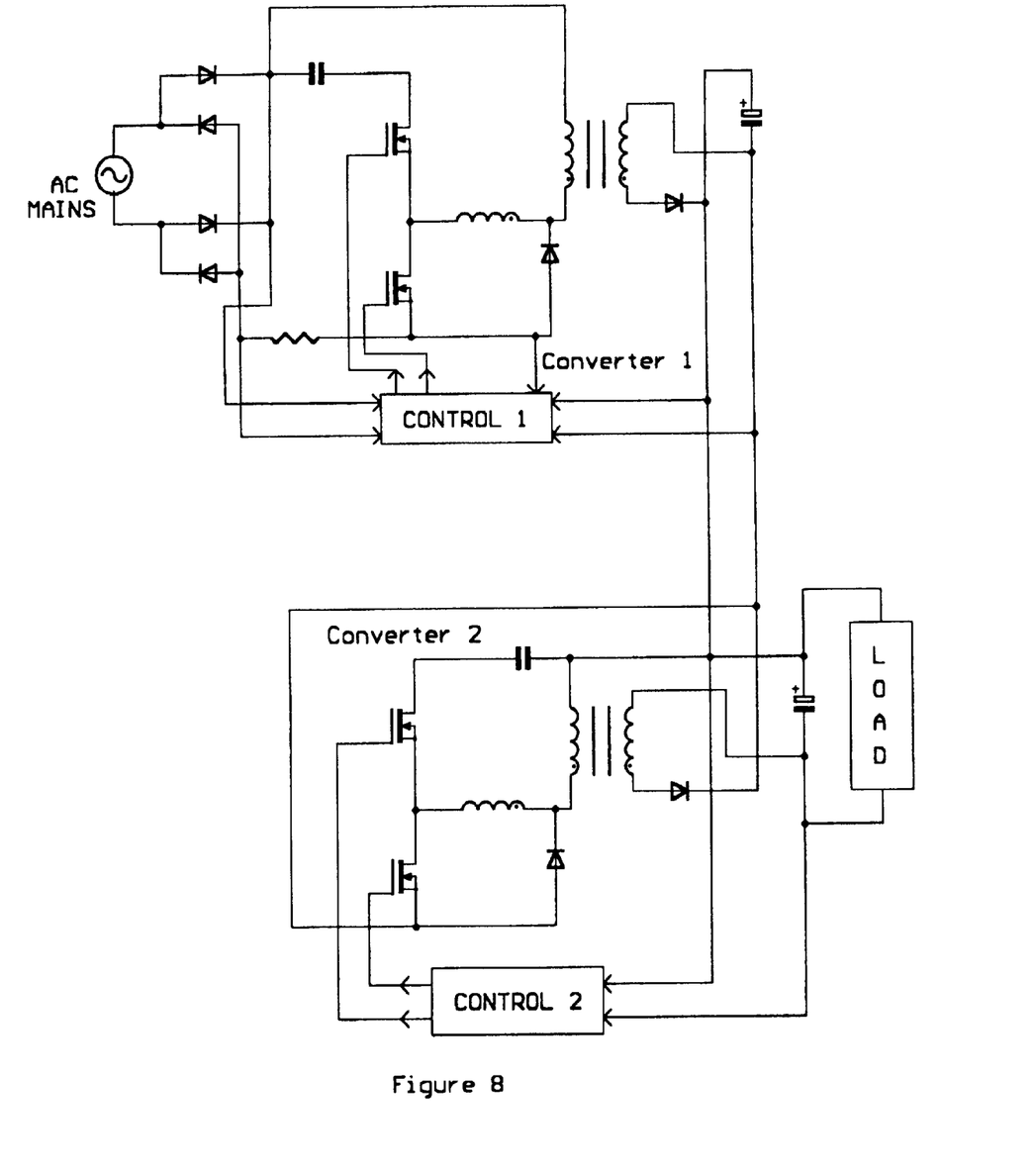
FIG. 8 illustrates another example of an embodiment of the subject invention using active clamp flyback converters for both power factor rectifier and output voltage regulator.

FIG. 8 is another embodiment of the invention in which the first sub-converter, which functions as a power factor rectifier, shown in the upper half of the FIG. 8, is an active clamp flyback converter. The second sub-converter in FIG. 8, which accomplishes output voltage regulation, shown on the bottom half of the figure, is also an active clamp flyback converter. The active clamp flyback converter is shown in FIG. 12 of U.S. Pat. No. 5,402,329 by Wittenbreder. The reader is also referred to the paper "Characterization of an Active Clamp Flyback Topology for Power Factor Correction Applications" by Watson, et al, published in the 1994 proceedings of the Applied Power Electronics Conference. The primary diode is added to the FIG. 8 circuit to clamp the ringing associated with the combination of the primary series inductor and the parasitic capacitors associated with the transformer windings and the output rectifier. The input to the second sub-converter is the output of the first sub-converter. The outputs of the two sub-converters are arranged in series so that the load voltage is equal to the sum of the output voltages of the two sub-converters. The FIG. 8 example provides output isolation through the flyback transformers. There is no isolation mechanism found in the FIG. 7 example. Another benefit of the active clamp flyback converter is that it is a zero voltage switching topology which eliminates all first order switching losses and largely eliminates rectifier reverse recovery effects. The active clamp flyback can be operated practically at much higher switching frequencies than can the boost derived power factor rectifier and single ended forward converter of the FIG. 7 example. The ability to operate at higher switching frequencies with zero voltage switching enables higher power densities and lower switching losses than can be achieved with the hard switching alternatives, shown in FIG. 7.

Figure 9:
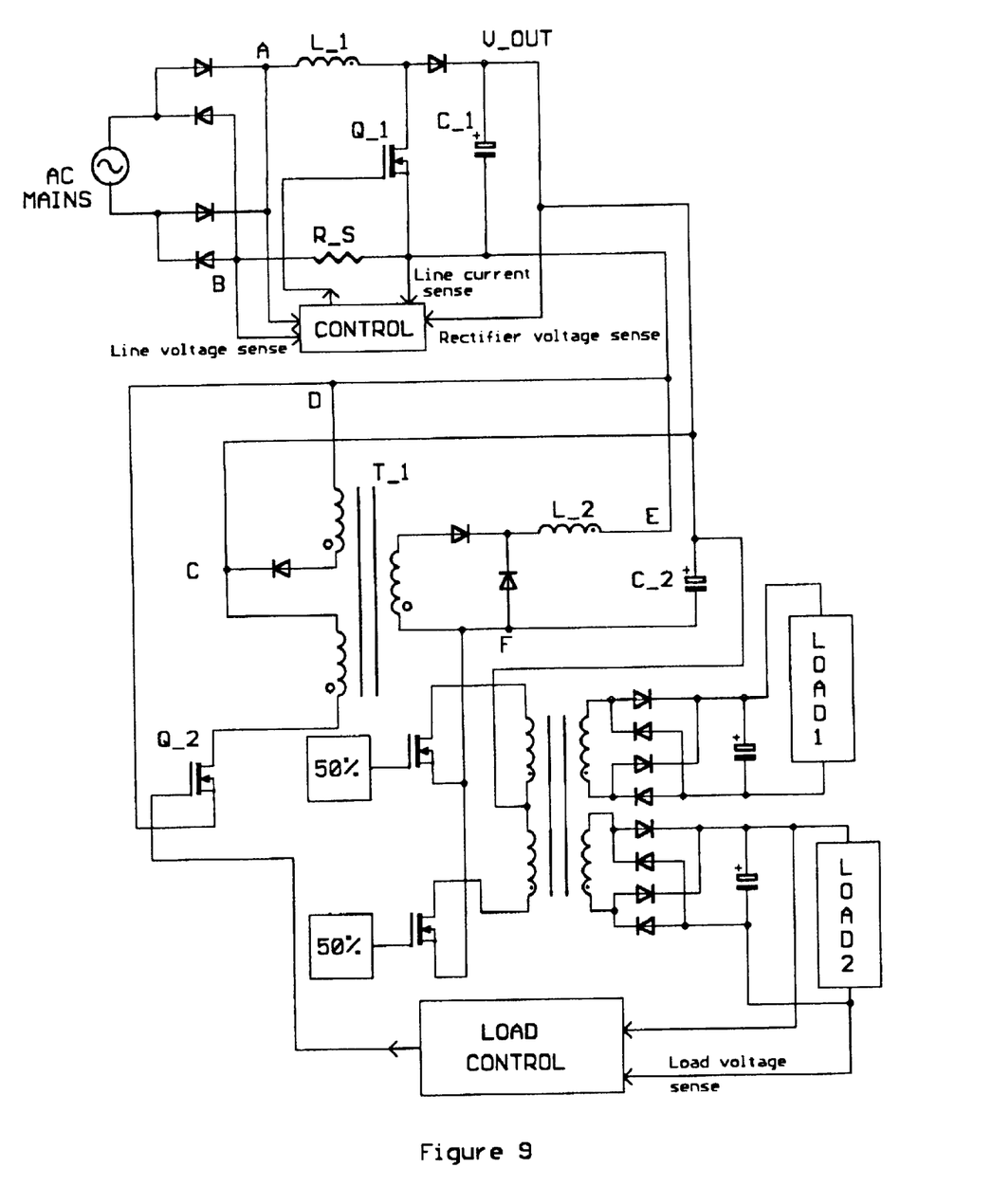
FIG. 9 illustrates another example of an embodiment of the subject invention, which is similar to the FIG. 7 example, except that a mechanism is illustrated for obtaining output voltage isolation and multiple outputs.

FIG. 9 is another embodiment based on the FIG. 7 circuit in which a push pull DC transformer circuit is added to the FIG. 7 circuit to provide output isolation and multiple regulated outputs. Another difference is that the output voltage feedback is derived from one of the isolated outputs so that the control loop can correct for errors introduced by the insertion of the DC transformer. Although a push pull DC transformer is shown in FIG. 9 it is clear to anyone skilled in the art of power conversion that similar results are achieved with the employment of any type of DC transformer. Several types of DC transformers are described and illustrated in *Modern DC-to-DC Switchmode Power Converter Circuits* by Severns and Bloom.

While the embodiments illustrated include only a few converter topologies it is clear to one skilled in the art of power conversion that the embodiments can be reconfigured with other converter topologies and that these configurations with other converter topologies, not shown in this specification, must be considered as embodiments of this invention. Although embodiments with only one or two outputs are illustrated in this specification, it is clear to anyone skilled in the art of electronic power conversion that converter systems with multiple outputs of any number must be considered embodiments of this invention by extension of the techniques illustrated for one and two converter outputs to converter systems with two or more outputs.

Conclusion, Ramifications, and Scope of Invention

Thus the reader will see that the power conversion system of the invention provides a novel structure and operating mechanism which provides both precisely regulated input current and precisely regulated output voltage and significantly reduces power losses and system size, weight, and cost.

While my above description contains many specificities, these should not be construed as limitations on the scope of the invention, but rather as preferred embodiments thereof. Many other variations are possible. For example, other variations include power converter systems with more than one output; power conversion systems in which the input current is precisely regulated but not proportional to the input voltage; power conversion systems in which the input is not an AC source of power but rather a complex source of power containing both AC and DC components. Accordingly, the scope of the invention should be determined not by the embodiments illustrated, but by the appended claims and their legal equivalents.

I claim:

1. A power conversion system comprising:

an input connected to a source of AC potential, a first power conversion means connected to said input and comprising an output coupleable to a load, a capacitor connected to said output, and control means for providing control of current flowing through said input a second power conversion means comprising an input connected to said output of said first power conversion means, an output coupleable to said load and said output of said first power conversion means, and control means for providing substantially precise regulation of voltage applied to said load a system output connected to said load comprising the series combination of said output of said first power conversion means and said output of said second power conversion means whereby said second conversion means processes less than one half of the total power provided to said load.

2. A power conversion system as set forth in claim 1, wherein said first power conversion means is a switched mode power conversion means or said second power conversion means is a switched mode power conversion means or both said first power conversion means is a switched mode power conversion means and said second power conversion means is a switched mode power conversion means.

3. A power conversion system as set forth in claim 2, further comprising DC transformer means for providing a multiplicity of outputs and galvanic isolation of those outputs.

* * * * *